US000001524H

United States Statutory Invention Registration [19]

[11] Reg. Number: H1524

[45] Published: Apr. 2, 1996

Thompson et al.

[54] METHOD FOR USING ELECTROMAGNETIC GROUNDED ANTENNAS AS DIRECTIONAL GEOPHONES

[75] Inventors: Arthur H. Thompson; Grant A. Gist; James A. Rice, all of Houston, Tex.

[73] Assignee: Exxon Production Research Company

[21] Appl. No.: 4,953

[22] Filed: Jan. 15, 1993

[51] Int. Cl.[6] ..... G01V 3/08; G01V 3/12

[52] U.S. Cl. ..... 324/334; 324/323; 324/332; 324/337; 324/344; 324/347; 367/14; 342/22

[58] Field of Search ..... 324/323, 334, 324/344, 347, 337, 336, 332, 348, 354, 357; 367/14

[56] References Cited

U.S. PATENT DOCUMENTS

| | | | |
|---|---|---|---|
| 2,054,067 | 9/1936 | Blau et al. . | |
| 2,148,679 | 2/1939 | Blau et al. . | |
| 2,156,259 | 5/1939 | Blau . | |
| 2,354,659 | 8/1944 | Bazhaw et al. . | |
| 2,805,727 | 9/1957 | Bazhaw . | |
| 3,384,811 | 5/1968 | Ikrath et al. . | |
| 3,392,327 | 7/1968 | Zimmerman, Jr. . | |
| 3,524,129 | 8/1970 | Ikrath . | |
| 3,621,380 | 11/1971 | Barlow, Jr. . | |
| 3,975,694 | 8/1976 | Melamed et al. . | |
| 4,104,611 | 8/1978 | Kalden . | |
| 4,507,611 | 3/1985 | Helms . | |
| 4,601,022 | 7/1986 | Muir . | |
| 4,612,506 | 9/1986 | Varotsos et al. . | |
| 4,628,266 | 12/1986 | Dzwinel | 324/334 |
| 4,692,905 | 9/1987 | Sobolev et al. . | |
| 4,724,390 | 2/1988 | Rauscher et al. | 324/344 |

(List continued on next page.)

OTHER PUBLICATIONS

S. T. Martner and N. R. Sparks, "The Electroseismic Effect," *Geophysics,* vol. XXIV, No. 2 (Apr. 1959) pp. 197–308.

R. A. Broding et al, "Field Experiments on the Electroseismic Effect," *IEEE Transactions on Geoscience Electornics,* Dec. 1963, pp. 23–31.

Leland T. Long and Wayne K. Rivers, "Field Measurement of the Electroseismic Response," *Geophysics,* vol. 40, No. 2 (Apr. 1975) pp. 233≧245.

Asch et al., "The Study of the Interaction of Seismic Waves and the Electrical Properties of Rocks", Preliminary Final Report to the National Science Foundation, Jan. 27, 1988, pp. 1–36.

*Primary Examiner*—Bernarr E. Gregory

[57] ABSTRACT

A method of seismic prospecting using electromagnetic grounded antennas to detect electromagnetic waves that are produced from acoustic waves in the earth's formation. Seismic waves reflected by a formation in the earth are converted into electromagnetic waves in the vicinity of the antenna according to the streaming potential theory. The antenna has two electrodes which detect the horizontal component of the electromagnetic waves, thus providing additional seismic information that is not readily available using standard geophones. Antennas are also not subject to coupling problems and thus provide more accurate information than traditional geophones. For example, using multi-component detection, all three components of the seismic pressure gradient can be detected. In addition, using geophones and antennas directly provides a method of separating source and receiver-generated static corrections for more effective stacking of seismic data and allows computation of seismic signal velocity through the low-velocity layer.

20 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS 4,774,469 9/1988 Sobolev et al. .
4,837,582 6/1989 Takahashi et al. .
4,904,942 2/1990 Thompson .
4,904,943 2/1990 Takahashi .
4,931,739 6/1990 MacLaren .
4,964,087 10/1990 Widrow ..... 367/45
5,041,792 8/1991 Thompson .
5,070,483 12/1991 Berni ..... 367/14

METHOD FOR USING ELECTROMAGNETIC GROUNDED ANTENNAS AS DIRECTIONAL GEOPHONES

FIELD OF THE INVENTION

The present invention relates to the acquisition of seismic data, and more particularly to the use of electromagnetic grounded antennas as directional geophones for improved detection of seismic waves.

DESCRIPTION OF THE RELATED ART

Conventional seismic prospecting is usually accomplished by generating acoustic waves from one or more seismic sources and then detecting reflections of those waves by interfaces in the earth formation being analyzed. Energy, usually in the form of an impulse from an explosion, is introduced into the ground at or near the surface. Spreading out from the source, the acoustic or seismic waves encounter discontinuities in the physical properties of the rocks comprising the earth. Discontinuities of exploration interest are generally interfaces between different types of rock or formations. Upon encountering these discontinuities, referred to as reflectors, the seismic waves are partially reflected back to the surface where they are detected and recorded. The time required for the reflected energy to return indicates the depth of a reflector. Plotting this time for each detected signal while moving along the surface, one can assemble a picture of the rock layers below from shallow depths to the deepest interface from which returning energy is measurable.

A common seismic source for reflection seismology is dynamite placed at or below the earth's surface. In many instances, the source is placed at the bottom of a water-filled hole drilled through the weathered layer. The weathered layer, also referred to as the low-velocity layer (LVL), is defined as the soil and rock layer near the surface. The weathered layer is generally poorly consolidated and absorbs the energy of the seismic source and thus is avoided whenever possible. Accordingly, many times the seismic source is placed below the weathered layer to reduce attenuation of the generated seismic waves. The weathered layer also attenuates reflected seismic waves traveling back to the surface, removing many of the high frequency components of the reflected seismic waves.

An explosion generates in solids both compressional waves in which the motion is substantially in the direction of travel and shear waves in which the motion is perpendicular to the compressional wave travel direction. Compressional waves are reflected by interfaces separating formations with different impedances, where a formation's impedance is the product of the formation's density and the compressional wave velocity. The amplitude of a reflected compressional wave is proportional to the difference of the impedances across an interface. Exploration seismology has traditionally analyzed reflected compressional waves, while the shear component of reflected seismic waves has generally been used less frequently. Detectors used in land exploration, called geophones, measure the vertical and/or horizontal component of the seismic wave, which is the time derivative of the displacement of the surface.

In summary, seismic energy reflected from a formation in the earth during seismic prospecting has both vertical and horizontal components corresponding to compressional waves and shear waves, respectively, and each of these components contain seismic information that can help evaluate a formation. As is well known in the art, both the compressional and shear components of any substance are necessary in order to fully understand the elastic properties of the substance. For example, both compressional wave velocity and shear wave velocity provide information on the elastic properties of a formation, which, for example, may then be used to determine if gas exists in the pore space of the formation. However, conventional geophones that measure shear waves are often poorly coupled to the surface of the earth, which attenuates the high frequency shear energy. In other words, while a geophone is sensing a reflected seismic signal, vibrations from the seismic waves tend to affect the operation of the geophone. Also, the high frequency components of the seismic wave detected by a geophone are subject to attenuation due to the weathered layer. Therefore, an improved method and apparatus is desired which detects the shear or horizontal components of seismic energy received during seismic prospecting.

Background on the use of antennas in seismic prospecting is also appropriate. It is known in the art that antennas may provide information similar to that obtained by geophones in detecting the direct arrival of seismic waves. The idea that antennas could be used as geophones dates back to the 1930's. However, the use of antennas was not seriously considered and their use was dismissed because they were considered to be too insensitive and highly variable from point-to-point. Consequently, antennas have not been used in practical seismic applications. For example, in *Field Experiments on the Electroseismic Effect,* IEEE Transactions on Geoscience Electronics, Dec. 1963, p. 23, the author concludes that the detection of seismic events through the conversion of seismic signals to electric signals was not sufficiently reliable and thus could not be recommended. U.S. Pat. Nos. 2,054,067 and 2,156,259 each disclose the use of antennas as geophones whereby an array of antennas is used to detect seismically induced resistance modulation of the subsurface. Each of these patents teach that this arrangement preferentially detects vertically arriving P-waves (compressional waves) and discriminates against S-waves (shear waves). Thus, these patents teach that the shear wave component is not received by an antenna.

Background on electroseismic prospecting is also deemed appropriate. Various seismic techniques in addition to traditional acoustical wave detection described above have been used in seismic exploration. One technique that has been recently developed is referred to as electroseismic prospecting or ESP. A method and apparatus for performing ESP is described in U.S. Pat. No. 4,904,942. In ESP, seismic energy applied to the earth by an explosion or seismic blast is converted into electromagnetic energy when mobile, conducting fluids are encountered in a formation. This EM energy is radiated back to the surface where it is detected and analyzed. As described in U.S. Pat. No. 4,904,942, a theory referred to as the "streaming potential" theory explains the conversion of seismic energy into electromagnetic energy within an earth's formation. This theory effectively analyzes what occurs when a seismic wave impacts a porous lithological formation causing fluid movement in the formation and is most pronounced when at least two immiscible fluids, such as oil and water or gas and water, are present in the formation. The phenomenon also exists in the presence of a lithological structure of high permeability where there is pore fluid in the structure.

In accordance with this theory, a molecular bond attraction exists between the fluid and the porous surface of the solid formation. These bonds are distorted or broken by the rapid movement of the fluid upon contact by an acoustical wavefront, thereby inducing in a dipole manner an electromagnetic response. This electromagnetic response produces EM waves which radiate back to the earth's surface and which can be detected and analyzed. The fluid movement accompanying a seismic pressure gradient is described by M. A. Biot in papers published by the Journal of the Acoustical Society of America in 1956 and 1962, at page 168 of volume 28 and page 1254 of volume 34, respectively. Others, such as J. O. Bockris and A. K. N. Reddy, have experimented with the streaming potential and reported circa 1973 on their findings. The application of the streaming potential theory in electroseismic prospecting is described in U.S. Pat. No. 4,904,942, previously referenced.

SUMMARY OF THE INVENTION

The present invention comprises a method and apparatus for operating one or more electromagnetic grounded antennas as directional geophones in seismic prospecting. Applicants have discovered that, since antennas are preferentially selective in the direction in which they are aligned, EM grounded antennas detect the shear component of the seismic wave and thus provide useful seismic polarization information. In addition, Applicants have discovered that antennas do not have the horizontal coupling problems associated with standard geophones. Also, antennas are useful in reducing static and noise effects in shear wave prospecting and allow direct measurements of seismic wave velocity and attenuation through the LVL.

An antenna comprising at least two electrodes is placed at or below the ground and is used to measure the induced voltage resulting from reflected seismic waves. Reflected acoustic or seismic energy in the neighborhood of the antenna near the subsurface is converted into an electromagnetic field through the streaming potential effect. The antenna is sensitive to the component of the seismic pressure gradient in the direction along the antennas' axis, i.e., the horizontal component, and integrates this pressure gradient over the length of the antenna. This selectivity to horizontal polarization leads to unique applications of antennas in seismology that are not available in the prior art.

Velocity information is also obtained from the detected electric field. The arrival of the seismic wave at each electrode is detected when the generated EM wave front crosses the first and second electrodes, respectively, and thus the travel time of the seismic wave between the electrodes can be determined. The detected antenna voltage is also relatively insensitive to mechanical coupling of the individual electrodes to the ground. This provides an advantage over geophones.

The antenna system is highly sensitive to fluids moving at the water table. If the water table is comparable in depth to the low-velocity or weathered layer (LVL), then the antenna will detect the EM field produced by the seismic wave before the reflected seismic wave traverses the LVL. Since EM waves are attenuated much less in the LVL than are seismic waves, the EM waves generated below the LVL retain the high-frequency information normally lost in the LVL. Also, since the EM signal is not delayed by the LVL, static velocity shifts are reduced.

An alternative embodiment of the invention includes multicomponent detection where all three components of the seismic pressure gradient are detected. Another embodiment includes geophones and antennas used together which provides a way to separate source- and receiver-generated static corrections for more effective stacking of seismic data. In addition, the difference in arrival times between the electromagnetic and seismic signals is used as a measure of the velocity of seismic waves through the LVL, and attenuation of the seismic signal is determined from the frequency content of the two signals. Finally, in yet another embodiment, the electrodes of the antenna are vertically deployed to detect the vertically polarized component of the seismic energy in either cross-hole or logging work.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE SPECIFIC EMBODIMENTS

Figure 1:
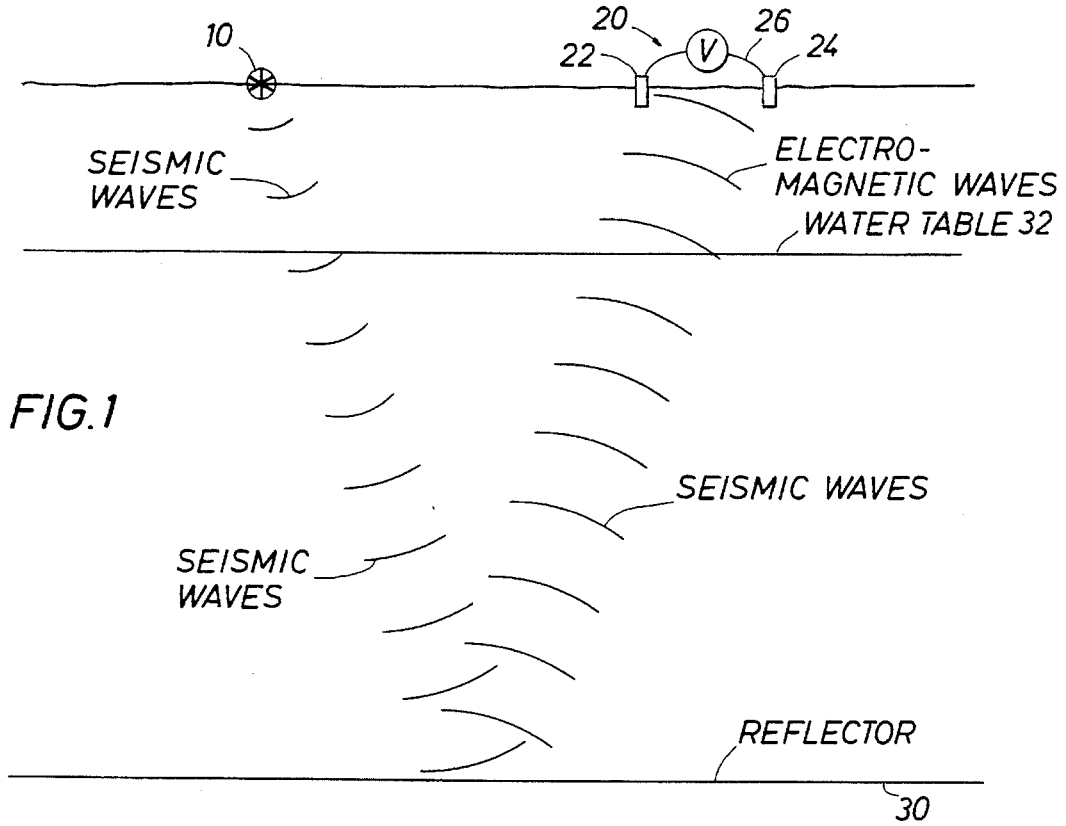
FIG. 1 illustrates a basic implementation of electromagnetic grounded antennas as directional geophones.

Referring now to FIG. 1, a method of operating an electromagnetic grounded antenna as a directional geophone is shown. A source 10 is used to generate acoustical or seismic waves into the earth, as shown. The source 10 may be placed either at or below the surface, as desired. When the seismic wave impacts a formation, P-wave acoustic energy (compressional waves) and S-wave elastic energy (shear waves) are radiated back to the surface as seismic waves.

An electromagnetic grounded antenna 20 according to the present invention is used to receive and detect these reflected seismic waves. According to this embodiment, the antenna 20 comprises two electrodes 22 and 24 that are placed in the ground and across which a voltage 26 is measured. The electrodes 22 and 24 are placed horizontally relative to the surface, as shown. It is noted that the electrodes 22 and 24 comprising the antenna may be placed either on the ground or below the earth's surface, as desired. In a preferred embodiment, the electrodes 22 and 24 are placed within a few feet of the surface. This placement is more convenient for field operation and is thought to provide similar data to buried electrodes. The embodiment shown in FIG. 1 utilizes an electromagnetic grounded antenna as a directional geophone to measure the voltage across the two electrodes that is produced by the reflected seismic waves.

When the seismic waves impact a formation, referred to as a reflector 30, both seismic waves and EM waves (not shown) are reflected back to the surface. EM waves are reflected back to the surface due to the "streaming potential" theory discussed in U.S. Pat. No. 4,904,942, which is hereby incorporated by reference. According to the "streaming potential" theory, when the seismic waves impact the reflector 30, a pressure gradient is established at the respective depth that pushes downward on the fluid in the formation in a substantially vertical direction, thereby breaking molecular bonds between the fluid and the porous surface of the solid formation surrounding the fluid. This effectively establishes a substantially vertical dipole throughout the depth of the formation and produces a vertical electric field in an upward vertical direction at the point of impact of the seismic wave against the reflector. The electric field produces a corresponding electromagnetic wave that emanates away from the impact region. EM waves generated from the reflector 30 are not shown in FIG. 1.

The seismic wave that is reflected back from the reflector 30 is also generally converted into electromagnetic energy in the neighborhood of the antenna 20 near the surface of the earth. This conversion is also caused by the "streaming potential" effect. The reflected seismic waves impact fluid in the water table 32, causing generation of EM waves, as shown. These generated EM waves are detected by the antenna 20 as an induced voltage 26.

An electromagnetic wave, unlike a reflected acoustic wave, travels at the speed of light. Therefore, when the seismic wave impacts the reflector 30 and is converted into an EM wave (not shown), the EM wave reaches the antenna virtually instantaneously. In contrast, the reflected seismic wave requires additional travel time to reach the near-surface where the water table 32 is located. Therefore, the method discriminates between reflected EM waves from the reflector 30 and EM waves generated in the vicinity of the antenna, i.e., the water table 32, using the time of arrival. EM waves reflected from the reflector 30 will reach the antenna 20 in approximately the time required for the seismic wave to travel from the source 10 to the reflector 30. The EM waves generated in the vicinity of the antenna 20 will reach the antenna in approximately the time required for the seismic waves to make a round trip from the surface to the reflector 30 and back to the near-surface where seismoelectric conversion again occurs.

Therefore, the operation of an electromagnetic geophone or electromagnetic antenna to detect the shear component of seismic waves, which is the subject of the present invention, is distinguishable from conventional electroseismic prospecting, which is concerned with EM waves generated at a reflector of interest deep below the surface. When an EM antenna is being used to detect seismic waves, the antenna 20 senses the presence of a reflected seismic or acoustical wave near the earth's surface due to the conversion of the seismic wave into an EM wave within the vicinity of the antenna 20. The vicinity of the antenna 20 is defined here as including the LVL, the water table 32, and also the shallowest point where seismoelectric conversion can occur.

Referring again to FIG. 1, the antenna 20 is preferably placed a few feet (usually 2 to 10 feet) below the earth's surface or on the near-surface of the earth. The induced voltage 26 measured by the antenna 20 is from the component of the electric field in the direction from one electrode to the other. The electric field is generated by the seismic pressure gradient such that $\Delta P/\Delta X \alpha E$ where $\Delta P/\Delta X$ is the derivative of the acoustic pressure with respect to distance along the antenna (the difference in pressure at the ends of the antenna divided by the length of the antenna) and E is the magnitude of the electric field.

Applicants have discovered that the antenna 20 is sensitive to the component of the seismic pressure gradient in the direction along the antennas' axis. The antenna 20 detects the horizontal component of the seismic pressure gradient and integrates this pressure gradient over the length of the antenna. Thus the antenna 20 acts as a dispersed detector, which provides increased detection of shear waves over conventional geophones, which can only measure received seismic data at one location. This selectivity to horizontal polarization leads to unique applications of antennas in seismology, as discussed further below.

To summarize, the antenna 20 detects the horizontally polarized component of electromagnetic signals resulting from the interaction of the reflected seismic (elastic) waves with partially fluid-filled porous, permeable soils and rocks in the neighborhood of the antenna 20. From the voltage measurement 26, the horizontal (shear) component of the seismic pressure gradient can be determined.

Figure 5:
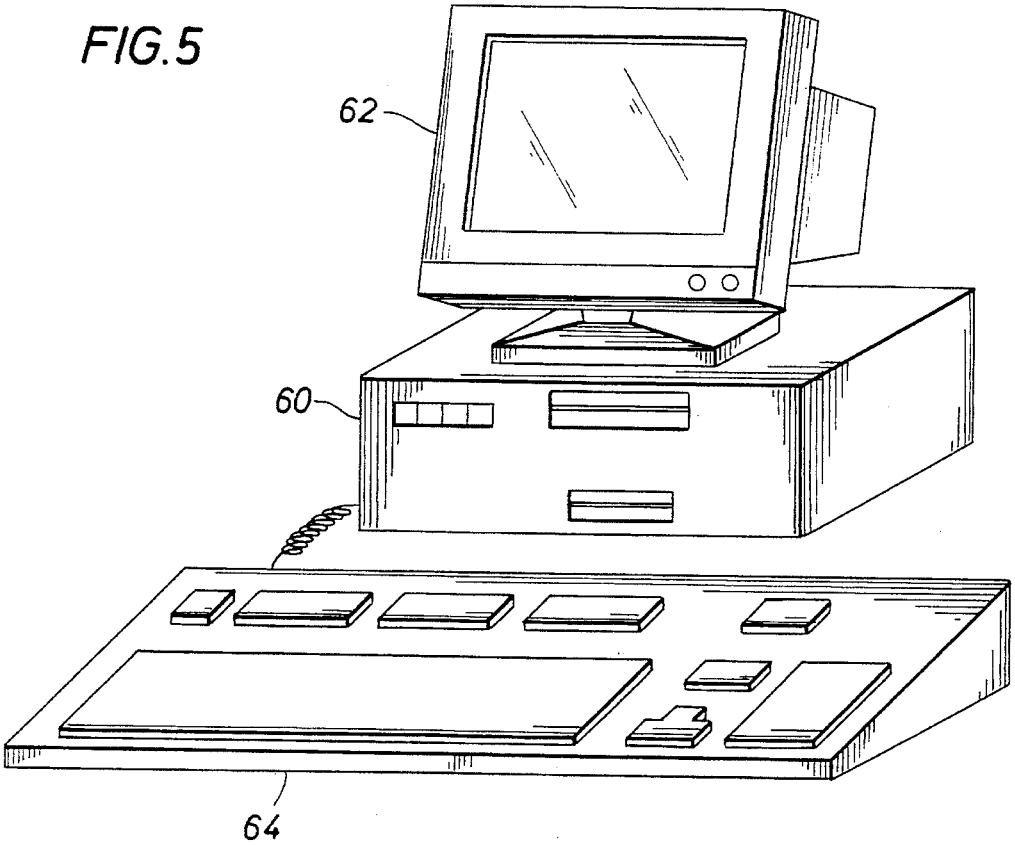
FIG. 5 illustrates a computer which is used to analyze received data according to the present invention.

Referring now to FIG. 5, a computer comprising system unit 60, monitor 62 and keyboard 64 is used to analyze and extract these shear wave data from the measured voltage 26 using techniques well known in the art. This includes separating out the compressional wave components and shear wave components using techniques known in the art. Also, the shear wave aspects produced by the seismoelectric conversion at the near surface can be separated from the seismoelectric conversion that occurs at the reflector 30 using the time of arrival. The computer is preferably either a workstation or personal computer (PC). Alternatively, a mainframe computer may be used, as necessary.

The prior art recognized that antennas may provide information similar to that obtained by geophones, although antennas have not been known to have been used in practical seismic applications. However, the application of antennas to detect the horizontal component of the seismic pressure gradient and the fact that antennas integrate this pressure gradient over the length of the antenna is a new discovery. Thus the extraction of shear wave data from voltages measured by an antenna is new in the art.

Electromagnetic grounded antennas provide a higher resolution of shear data than that previously obtainable. The attenuation of seismic shear waves by the LVL is usually much more deleterious to signal band width than for compressional waves. This reduces the utility of seismic shear wave data and thus heretofore shear wave data have not been used extensively. However, the use of an antenna 20 according to the present invention avoids this problem by detecting electromagnetic conversions from up-coming shear waves arriving at the water table, instead of merely detecting seismic or acoustic waves at the surface. Since EM waves are attenuated much less than seismic waves in the LVL, attenuation problems are reduced, as discussed below.

In traditional seismic prospecting, the high frequency components of the seismic wave are attenuated as the seismic wave passes through the LVL. If the water table 32 is comparable in depth to the LVL, then the antenna 20 of the present embodiment will detect the portion of seismic wave energy that converts to EM energy before the seismic wave has traversed the LVL. If this seismoelectric conversion occurs prior to the reflected seismic wave passing through the LVL, as shown in FIG. 1, the EM wave thus produced will retain the high-frequency information that is normally lost when the seismic wave traverses through the LVL in traditional seismic prospecting because, in contrast to seismic waves, EM waves are not significantly attenuated in the LVL. Transmission of electromagnetic signals depends on the electrical properties of the formation, whereas acoustic signals are transmitted from one rock to another, and thus acoustic transmission is affected by the contact of the rocks. Loosely contacted formations, such as the LVL, result in high seismic signal attenuation and therefore poor signal transmission. Electromagnetic transmission of signals is not affected by this type of attenuation, and thus EM waves are much less attenuated in the LVL. In addition, since EM wavelengths are much greater than the depth of the water table in soils, attenuation is further reduced.

Velocity information in the detected electric field is also obtained using the antenna 20. The first arrival of the seismic wave is detected when the EM wave front crosses the first electrode 22 in the antenna 20 while the pulse is broadened by the travel time of the seismic wave between electrodes 22 and 24. The travel time between the two electrodes 22 and 24, in addition to the depth of the LVL, is thus used to determine the velocity of the seismic waves.

The detected antenna voltage 26 is only dependent on the motion of pore fluids in the region between or in the neighborhood of the electrodes 22 and 24 and is relatively insensitive to the mechanical coupling of the individual electrodes to the ground. This phenomenon provides an advantage over horizontal geophones where coupling can lead to poor results. Geophones tend to have very poor acoustic coupling to the surface since the soil at the surface is generally poorly consolidated. Poor coupling causes high frequency components to be damped out. However, antennas do not have this problem since they detect EM waves, not acoustic waves. In addition, wind noise does not affect operation of the antenna 20, whereas wind noise does present problems to horizontal geophones.

The signal received by the antenna 20 is also averaged over a volume of the earth that is comparable to the volume sensed by the electrodes, which might be on the order of 100 m or larger. In contrast, a geophone is only sensitive to the immediate neighborhood of the ground in which it is imbedded. Thus, antennas are capable of producing better results than geophones.

The design of the antenna 20, or of the individual antennas used in an antenna array, includes several considerations. First, selection of the appropriate length of an antenna on the surface or along a hole drilled into the earth is based on conventional seismic-style considerations such as: 1) the antenna must be long enough compared to the expected wavelength of the field that it is detecting, 2) there must be a detectable signal (potential difference) between endpoint electrodes, i.e., the electrodes have to be far enough apart so that there is a significant difference in the voltage at the two ends of the antenna; otherwise, the electric field is too small to be detected; and 3) the antenna must not be too long that it aliases wavelengths that are relevant to the imaging spectrum for the data. Another important consideration is the selection of the antenna and electrode material. These materials can be based on conventional considerations developed in electromagnetic and magnetotelluric geophysics.

When using arrays of antennas, the arrays are preferably designed according to standard electromagnetic geophysics and/or radar methods for maximizing signal to noise ratios through techniques such as stacking of signals and noise-cancelling array widths, as is well known in the art. Another consideration is the selection of signal amplification and recording systems. This selection is based on appropriate combination of existing high fidelity amplifiers and seismic recording technology. Care should be taken to reduce transient electromagnetic noise in the system using devices such as a DC battery power supply rather than an AC generator as the source of power for the recording system and taking care to ground the recording system at a point several times more distant from the antennas than the antenna length.

Figure 2:
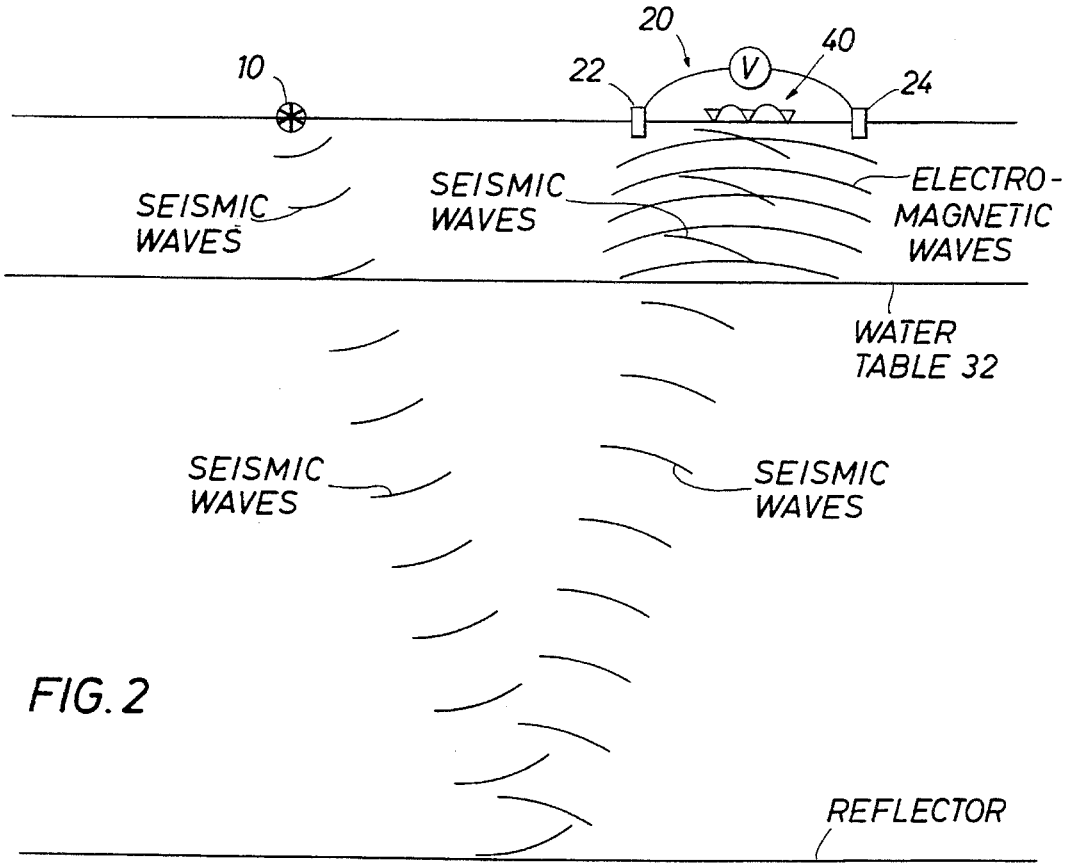
FIG. 2 illustrates combined use of electromagnetic antennas and geophones used to measure low velocity layer (LVL) velocity and attenuation of seismic signals.

Referring now to FIG. 2, an electromagnetic grounded antenna 20 in conjunction with geophones 40 may also be used in performing static corrections. The primary conversions of seismic signals into electromagnetic signals that have been observed on antennas in field experiments arise from the shallowest water table layer. Accordingly, recorded signals have receiver statics (shifts in event arrival times due to near-surface effects) for antenna geophones that are datumed to the water table (which is also usually the shallowest seismic refracting layer and is used for refraction statics corrections in seismic processing), whereas conventional mechanical geophones are datumed to the surface of the earth. The topographic relief of the surface is generally greater and the seismic velocity variability of near-surface materials between receiver locations is also greater than for the water table. Consequently, antennas need much smaller receiver static adjustments than conventional geophones. Due to this difference in statics, combined use of geophones and antennas allows separation of source- and receiver-generated static corrections for more efficient stacking of seismic data.

An electromagnetic grounded antenna 20 and several geophones 40 are used in the embodiment of FIG. 2 to measure the velocity of signals traveling through the near surface layer (low velocity layer—LVL) and also to measure the attenuation of signals in the LVL. This method comprises simultaneous recording of signals from upcoming seismic waves directly on the surface geophones 40 and their electromagnetic conversion at the water table on co-located or negligibly-offset antennas 20. The depth from the surveyed surface geophone locations to the water table is preferably determined beforehand by seismic refraction statics or during field work by shot-hole drilling observations or by other standard means.

As previously noted, electromagnetic waves travel at the speed of light, while seismic waves travel at the speed of sound, and thus EM waves travel at a much faster rate than seismic waves. Because of the vast difference in the speeds of the two waves, generated EM waves reach the antenna in approximately the travel time of its derivative seismic wave. The arrival time difference of the seismic and electromagnetic signals indicates the seismic wave travel time through the LVL, since the speed of electromagnetic propagation through the LVL is virtually instantaneous compared to the speed of elastic wave propagation. The LVL depth divided by the travel time provides the seismic velocity. In addition, comparison of the frequency spectra of the signals detected on the antenna versus the geophone indicates relative signal attenuation due to the LVL.

Figure 3:
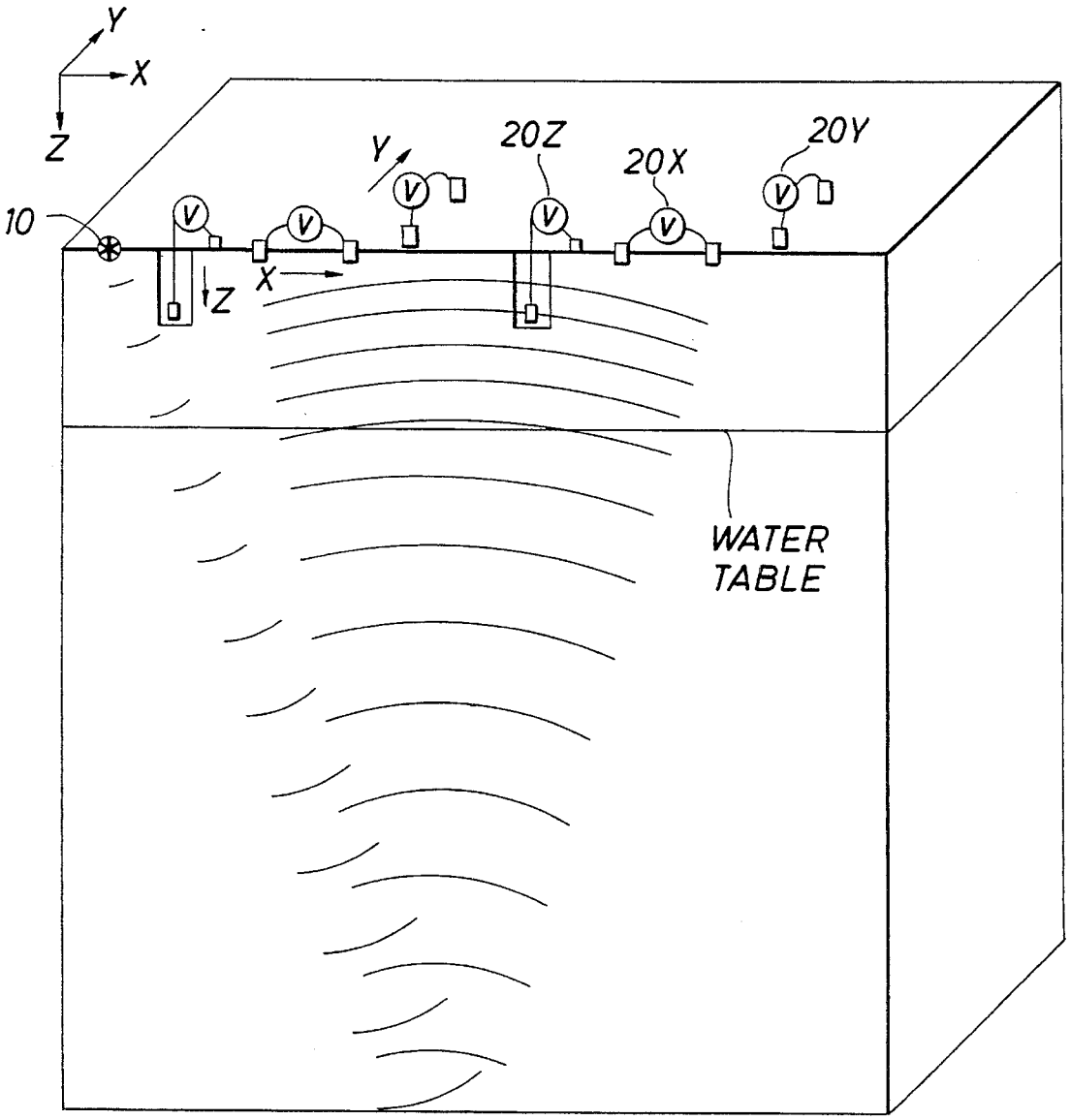
FIG. 3 illustrates application of electromagnetic antennas to detect multiple components of signals.

Alternate embodiments of this invention can also be implemented in specific applications. Referring now to FIG. 3, one embodiment uses a number of antennas in multicomponent detection. In this embodiment, three non-parallel antennas are used at each multicomponent signal detection station to detect the X, Y, and Z components of the electric field, and thus all three components of the electric field are detected. For example, at each station, a vertical antenna 20Z approximately three feet long and two orthogonal horizontal antennas 20Z and 20Y of length equal to station spacings set by anti-aliasing considerations (approximately 100 feet long and possibly of unequal lengths) provide a sensor system to detect the three orthogonal components of mechanical motion affecting relative fluid/rock motions. These signals are preferably each recorded as seismic-like amplitude versus time traces and are processed for imaging in the same way as would be done for horizontal geophones because polarity flips in amplitudes for in-line (SV-wave) horizontal components, as one passes from one side of the seismic source to another, is the same for in-line horizontal antennas as for in-line horizontal geophones. In addition, as previously mentioned, attenuation of seismic waves by the near-surface is avoided because the antennas detect seismic waves converted to electromagnetic signals at the water table.

Figure 4:
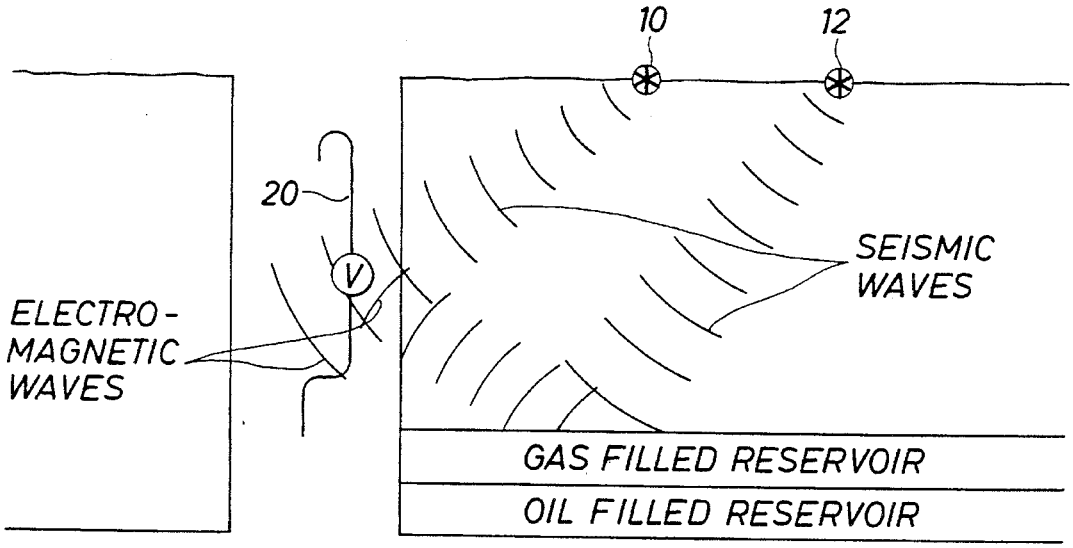
FIG. 4 illustrates an electromagnetic antenna used to detect shear waves downhole.

FIG. 4 illustrates vertical seismic profiling (VSP) using two sources 10 and 12 and one antenna 20 according to the present invention in which detection of shear is desired. This embodiment utilizes vertically deployed electrodes to detect the vertically polarized component of shear wave energy converted to electromagnetic signals either at the borehole wall or conducting fluid insulating or fluid-gas interfaces in nearby rock formations. It is also noted that electrodes deployed in horizontal arrays, either suspended in the borehole fluid or in contact with the borehole wall, can detect the horizontally polarized components. It is contemplated that virtually any type of arrangement of sources and detectors can be used, including cross-borehole.

In addition, arrays of antennas may be used like geophones to select particular components of the pressure field, to reject an unwanted signal, to stack a signal for improved signal-to-noise ratio, and to directly measure velocity and attenuation. With the use of sophisticated detection techniques, such as using arrays of antennas analogous to geophone arrays, antennas can achieve sensitivity comparable to geophones.

Therefore, the use of antennas according to the present invention offers certain advantages over geophones. First, because antennas are preferentially selective in the direction in which they are aligned, they detect the shear component of seismic waves. The detected EM signal is distributed over the length of the antenna, and thus improved shear wave data are obtained. Also, antennas do not have horizontal coupling problems and, therefore, supply enhanced directional and temporal derivative information. Antennas are also particularly useful in reducing static and noise effects in shear-wave-prospecting and in direct measurements of the low-velocity-layer (LVL) velocity and attenuation. These features enable the collection of more reliable high-resolution shear-wave land data.

Having described the invention above, various modifications of the techniques, procedures, material and equipment will be apparent to those in the art. It is intended that all such variations within the scope and spirit of the appended claims be embraced thereby.

What is claimed is:

1. A method of seismic prospecting using electromagnetic grounded antennas, comprising the steps of:

placing an antenna comprising at least two electrodes at or below the earth's surface;

initiating a seismic wave into the earth from a source location such that the downgoing seismic wavefront encounters a reflector and is reflected back to the surface as reflected seismic waves;

detecting electromagnetic waves generated by the reflected seismic waves in the vicinity of the antenna;

measuring the induced voltage across the antenna; and analyzing the induced voltage to determine the horizontal component of the reflected seismic wavefront.

2. The method of claim 1, wherein said step of placing includes placing said two electrodes horizontally relative to the surface.

3. The method of claim 1, wherein said step of placing includes placing an array of antennas at or below the earth's surface.

4. The method of claim 1, wherein said antenna is placed so as to be spaced apart from said seismic source.

5. The method of claim 1, wherein said step of placing includes placing said antenna below the earth's surface.

6. The method of claim 1, wherein said source location is located below the earth's surface.

7. The method of claim 1, wherein said step of placing includes placing said antenna below the earth's surface; and wherein said source location is located below the earth's surface.

8. The method of claim 1, wherein said step of placing includes placing said antenna on the earth's surface.

9. The method of claim 1, wherein said source location is located on the earth's surface.

10. The method of claim 1, wherein said step of placing includes placing said antenna on the earth's surface; and wherein said source location is located on the earth's surface.

11. The method of claim 1, wherein said step of analyzing the induced voltage includes separating the voltage resulting from compressional and shear wave components of the reflected seismic wavefront by using the time of arrival of the electromagnetic waves.

12. The method of claim 1, wherein said step of analyzing the induced voltage includes separating the voltage resulting from electromagnetic waves generated by the reflected seismic wavefront in the vicinity of the antenna from the voltage resulting from electromagnetic waves generated by the reflector by using the time of arrival of the electromagnetic waves.

13. A method of determining seismic wave velocity, comprising the steps of:

placing an antenna comprising first and second electrodes at or below the earth's surface, wherein said electrodes are positioned horizontally and said second electrode is placed at a selected distance from said first electrode;

initiating a seismic wave into the earth from a source location such that the downgoing seismic wavefront encounters a reflector and is reflected back to the surface as reflected seismic waves, wherein said reflected seismic waves generate electromagnetic waves in the vicinity of the antenna;

determining the time of arrival of said electromagnetic waves at said second electrode; and determining the velocity of said reflected seismic waves by calculating the ratio of said distance between said first and second electrodes to the difference in times of arrival of said electromagnetic waves at said electrodes.

14. The method of claim 13, wherein said step of placing includes placing said antenna below the earth's surface.

15. The method of claim 13, wherein said source location is located below the earth's surface.

16. A method of seismic prospecting using electromagnetic grounded antennas, comprising the steps of:

placing three antennas at or below the earth's surface, wherein said antennas are placed orthogonally relative to each other;

initiating a seismic wave into the earth from a source location such that the downgoing seismic wavefront encounters a reflector and is reflected back to the surface as reflected seismic waves;

said three antennas detecting electromagnetic waves generated by the reflected seismic waves in the vicinity of said antennas;

measuring the induced voltage across each of said antennas; and analyzing the induced voltage to determine the X,Y, and Z components of the reflected seismic waves.

17. A method of seismic prospecting using electromagnetic grounded antennas, comprising the steps of:

placing an antenna comprising first and second electrodes in the borehole of a well, the electrodes being spaced apart;

initiating a seismic wave into the earth from a source location;

detecting electromagnetic waves generated by the seismic wave by measuring an induced voltage across the antenna; and analyzing the induced voltage to determine the component of the seismic wave which is parallel to the antenna.

18. The method of claim 17 wherein the first and second electrodes are vertically deployed in the well.

19. The method of claim 17 wherein the first and second electrodes are deployed in a horizontal array in the well.

20. The method of claim 17 wherein the first electrode is deployed in a first borehole and the second electrode is deployed in a second borehole.

* * * * *